June 25, 1957 R. BEAUFOY 2,797,320

ELECTRICAL SIGNALLING SYSTEMS

Filed May 26, 1953 2 Sheets-Sheet 1

Inventor Raymond Beaufoy
by [signature]
Attorney

June 25, 1957 R. BEAUFOY 2,797,320

ELECTRICAL SIGNALLING SYSTEMS

Filed May 26, 1953 2 Sheets-Sheet 2

Inventor Raymond Beaufoy
by [signature]
Attorney

United States Patent Office 2,797,320

Patented June 25, 1957

2,797,320

ELECTRICAL SIGNALLING SYSTEMS

Raymond Beaufoy, Taplow, England, assignor to British Telecommunications Research Limited, Taplow, England, a British company Application May 26, 1953, Serial No. 357,527

Claims priority, application Great Britain May 27, 1952

4 Claims. (Cl. 250—27)

The present invention relates to electrical signalling systems and is more particularly concerned with arrangements for the sampling on an input waveform at suitable intervals and the derivation therefrom of pulses of constant amplitude and duration, but dependent upon the sign of the input waveform at the instant of sampling.

The need for such equipment often arises in connection with apparatus for storing and manipulating information in the form of binary digits, for instance computers and various forms of control equipment. A specific application of the invention is to storage equipment of the magnetic drum type, particularly when this equipment is used for controlling the setting up of telephone connections in response to dialled impulses or other suitable signals. The input waveform derived from the drum in such cases is often of indifferent shape and would be quite unsuitable for exercising the required control directly.

In these circumstances it is generally found desirable to have two outputs, one of which is the inverse of the other, that is to say, one output comprises pulses representing registrations stored on the register device, i. e. the digit 1, while the other output represents the absence of registrations on the register device i. e. the digit 0. The pulses are the same in the two cases, and may be made to be either positive or negative by suitable circuit arrangement. The object of the invention is to derive such pulses in a simple and reliable manner.

According to one feature of the invention in a sampling arrangement for obtaining pulses over one or other of two outputs in accordance with the instantaneous polarity of a control wave at the instant of sampling the pulses being of predetermined shape and size dependent upon a driving waveform, the driving waveform is applied to the anodes or cathodes of a thermionic trigger circuit comprising a pair of valves with their anodes and grids cross-connected and the control wave is applied to the grid of one of the valves by way of a rectifier the resulting potentials of the anodes serving to provide the desired outputs.

According to another feature of the invention in a sampling arrangement for obtaining squared pulses of uniform length from a control waveform when it is of one polarity at the instant of sampling but not when it is of the other polarity, a rectangular driving waveform of fixed frequency is applied to the anodes or cathodes of a thermionic trigger circuit comprising a pair of valves with their anodes and grids cross-connected and the control waveform is applied to the grid of one of the valves by way of a rectifier while the potential of the grid of the other is prevented from falling below a predetermined minimum value, the required output being obtained from the anode of one of the valves by way of a cathode follower circuit.

Figures 1, 2:
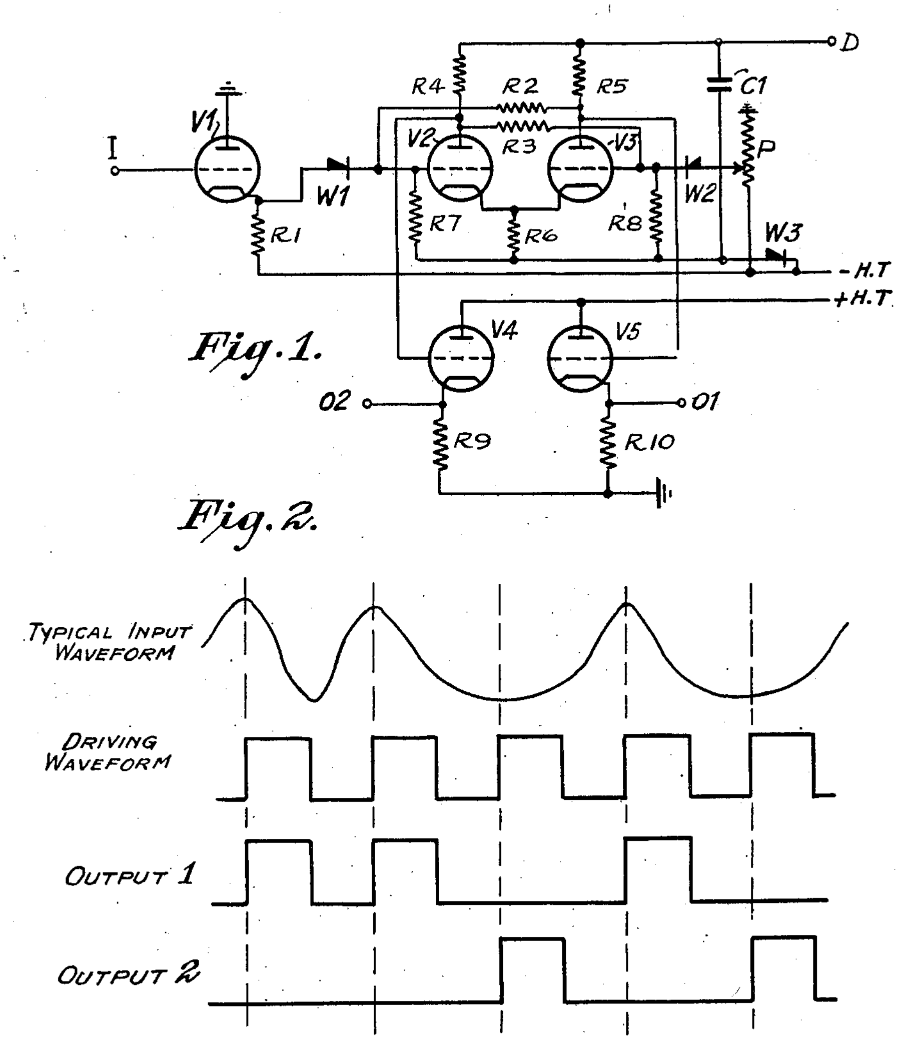
Figure 3:
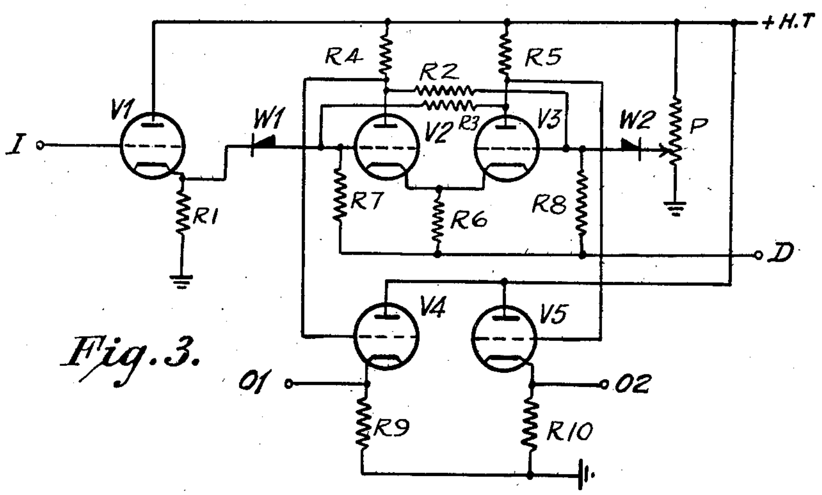
Figure 4:
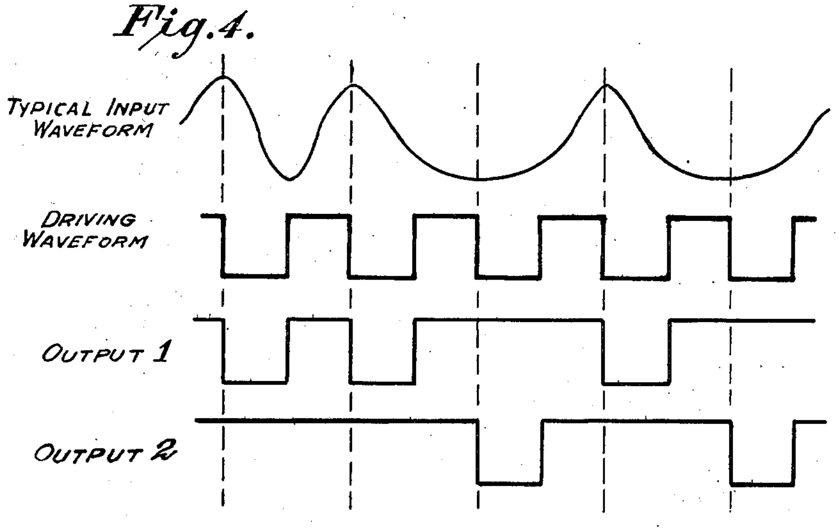

The invention will be better understood from the following description of two possible embodiments which are illustrated in the accompanying drawings comprising Figs. 1–4. Fig. 1 shows an arrangement for producing positive output pulses, Fig. 2 shows typical waveforms involved, Fig. 3 shows a modified arrangement designed to produce negative output pulses and Fig. 4 again shows the waveforms involved. The driving arrangements are different in the two cases, but each could be used in either case though the arrangement shown is preferable.

Considering first the arrangmeent of Figure 1, which is suitable for an input waveform of the type shown in Figure 2, it will be seen that the sampling unit comprises five thermionic valves, the heaters for which in accordance with well-understood convention are not shown. Two of these valves form the trigger circuit and two further valves associated therewith give a low impedance output. The input is applied to the grid of the valve V1 which has its anode connected to earth and is arranged as a cathode follower having the negative terminal of the high tension source connected to the cathode resistor R1. In view of the earthed anode connection, the negative voltage of the source may be quite high, for instance of the order of 200 volts.

The valves V2 and V3 forming the trigger circuit represent a modification of the well-known Eccles-Jordan flip-flop circuit and have their grids and anodes cross-connected by way of resistors R2 and R3. The modification consists in that the grids are subjected to potentials of such value that at times the circuit is blocked and both valves conduct simultaneously. The high tension positive connection to this pair of valves is supplied through anode resistors R4 and R5 respectively by way of a continuously operating generator connected to terminal D and having a waveform substantially similar to that required at the output terminals O1 and O2.

As shown in Figure 2, this driving waveform, the variations in which may be of the order of 50 volts, is substantially square and such a wave may be obtained by any well-known method. The potential across the trigger circuit V3 is maintained constant by means of the capacitor C1, the charging path for which is provided by the rectifier W3. As a result of this the potential changes represented by the different values of the driving waveform are in effect applied to the cathodes of the valves by way of the common resistor R6. Separate grid leak resistors R7 and R8 are associated with the valves V2 and V3 respectively.

The output from the cathode of valve V1 is applied to the grid of valve V2 by way of the rectifier W1. A biassing potential is applied to the grid of valve V3 by way of rectifier W2 from the potentiometer P connected between earth and H. T. negative. This is set to such a position as to represent the dividing line between positive and negative conditions of the input potential, i. e. the value which determines whether pulses shall appear in Output 1 or Output 2. The anode of valve V2 is connected to the grid of valve V4 provided with cathode resistor R9 and connected as a cathode follower so as to give an output from terminal O2. Similarly, the anode of valve V3 is connected to the grid of valve V5 having a cathode resistor R10 providing an output to terminal O1. The high tension source feeding the valves V4 and V5 must obviously be separate from that associated with the driving waveform generator feeding valves V1, V2 and V3, since valve V1 has its anode earthed and valves V4 and V5 have their cathodes earthed.

The operation will be more clearly understood from consideration of the effect of the control waveform shown in Figure 2. It is arranged that when the driving waveform is in its negative state or "down," i. e. at the beginning of the second curve shown in Fig. 2, the valves V2 and V3 are both conducting and both anodes may in fact be below earth potential. Since these anode potentials are applied to the grids of valves V4 and V5 which have their cathodes earthed, both these valves are cut off and consequently the output terminals O1 and O2 are at earth potential. When the driving waveform is rising, which will not in practice take place instantaneously as the showing in Figure 2 might suggest, one of the valves V2 or V3 will be held conducting longer than the other. This will be appreciated when it is realised that a constant potential representing the zero axis of the input waveform is applied to the grid of valve V3 while the potential applied to the grid of valve V2 is variable dependent on the instantaneous value of this waveform.

With the waveform shown in Figure 2 and considering the instant of time represented by the dotted line on the extreme left, the grid of valve V2 will be at a higher potential than the grid of valve V3 since the waveform is positive and consequently the trigger circuit will take up the one of its stable states in which valve V2 is conducting and valve V3 is non-conducting. In these circumstances, the potential applied to the grid of valve V5 will be increased to enable it to conduct and thus the potential of output terminal O1 rises to a value comparable with that of the driving waveform while terminal O2 remains at earth potential. This is indicated in the two lower curves in Figure 2, Output 1 being obtained from terminal O1 and Output 2 from terminal O2. This condition is maintained for the duration of the driving waveform in its positive or "up" condition independent of any subsequent changes in the potential represented by the control waveform since the grids of valves V2 and V3 are considerably higher in potential than the input sides of rectifiers W1 and W2. In other words, both these rectifiers are biassed to the non-conducting condition so that the trigger circuit is isolated from its input.

When the driving waveform again passes to the "down" condition, both valves V2 and V3 again conduct and consequently both valves V4 and V5 are cut off and the potential of the output terminals O1 and O2 returns to earth. This also is shown in the curves of Figure 2.

The process is repeated for each cycle of the driving waveform and it will be seen that with the control waveform indicated in Figure 2, on the third occasion that the driving waveform changes to its "up" condition, that is corresponding to the central dotted line, the control waveform is negative and consequently it is valve V3 which remains conducting and the cut-off condition of valve V2 causes valve V4 to conduct so that the potential of output terminal O2 is raised. It is though that the control waveform shown in Figure 2 offers sufficient variations to make clear the manner in which the circuit operates.

The arrangement of Figure 3 is generally similar but differs from the arrangement of Figure 1 in that the outputs are negative rather than positive pulses, though as before Output 1 corresponds to the positive condition of the control waveform and Output 2 to the negative condition. From a comparison of Figures 1 and 3, it will be seen that the main difference is that the rectifiers W1 and W2 are reversed and that the driving waveform applied by way of terminal D is now applied directly to the cathodes of the valves V2 and V3. In these circumstances, the capacitor C1 and rectifier W3 are no longer required. Moreover a common H. T. source may be used for all the valves V1–V5, it being understood that a connection to earth is made through the driving waveform generator. In addition, terminal O1 is now associated with the cathode of valve V4 and terminal O2 with the cathode of valve V5.

Considering the operation briefly, it will be understood that when the driving waveform is in its "up" condition, both valves V2 and V3 are cut off so that cathode follower valves V4 and V5 both conduct and Outputs 1 and 2 are at their maximum positive potential. When the driving waveform is falling, one valve is held cut off longer than the other since the potential applied to the grid of valve V2 through rectifier W1 is variable while that applied to the grid of valve V3 is fixed by the potentiometer P. Hence dependent on the polarity of the control waveform, the trigger circuit takes up the appropriate stable condition. Thus again considering the instant corresponding to the dotted line on the extreme left, the valve to conduct will be valve V2 and accordingly in response to the reduced potential applied to the grid of valve V4, this valve is cut off and the potential on output terminal O1 falls. Valve V5 continues to conduct however so that the potential on output terminal O1 is unchanged. This condition is maintained for the duration of the "down" condition of the driving waveform as again the grids of the valves V2 and V3 are isolated from their inputs by the rectifiers W1 and W2.

From what has already been said in connection with Figure 1, it will be appreciated that when the instant corresponding to the central dotted line is reached, the negative potential obtained from the cathode of valve V1 will ensure that valve V2 is cut off and valve V3 conducts, thereby cutting off valve V5. In this case therefore, Output 1 remains at the maximum positive potential while Output 2 is lowered to earth potential.

It will be noted that in both the Figure 1 and Figure 3 arrangements, the essential point is that the negative end of the trigger circuit is driven by the driving waveform, which is effected directly in the Figure 3 arrangement and by virtue of the capacitor C1 and rectifier W3 in the Figure 1 arrangement. In both cases, during the off period of the output pulses i. e. the second half of the period between the dotted lines, the rectifiers W1 and W2 are biassed to their low resistance condition while during the on periods i. e. the first half of the cycle, they are biassed to their high resistance condition and it is arranged that the maximum excursions of the input waveform during these on periods cannot render W1 conducting.

I claim:

1. A sampling arrangement for obtaining defined pulses over one or other of two outputs in accordance with the instantaneous polarity of a control wave, comprising in combination, a first thermionic valve, means for applying a control wave to the control grid of said valve, a pair of further thermionic valves, a first resistor, a second resistor, cross-connections between the control grids and anodes of said pair of valves by way of said first and second resistors respectively, a third resistor and a fourth resistor connected respectively to the anode of said pair of valves, means for applying a driving waveform of predetermined shape and amplitude to said third and fourth resistors, a first rectifier connected between the cathode of said first valve and to the control grid of one of said pair of valves, a second rectifier, means for applying control potential by way of said second rectifier to the control grid of the other of said pair of valves, a pair of output terminals and means for varying the potentials of said output terminals corresponding respectively to the potentials of the anodes of said pair of valves.

2. A sampling arrangement for obtaining defined pulses over one or other of two outputs in accordance with the instantaneous polarity of a control wave, comprising in combination, a first thermionic valve, means for applying a control wave to the control grid of said valve, a pair of further thermionic valves, a first resistor, a second resistor, cross-connections betwen the control grids and anodes of said pair of valves by way of said first and second resistors respectively, a third resistor and a fourth resistor connected respectively to the anodes of said pair of valves, means for applying a driving waveform of predetermined shape and amplitude to said third and fourth resistors, a first rectifier connected between the cathode of said first valve and the control grid of one of said pair of valves, a second rectifier, means for applying potential by way of said second rectifier to the control grid of the other of said pair of valves, means for adjusting said applied potential, a second pair of thermionic valves having their control grids connected respectively to the anodes of said first pair, and two output terminals connected respectively to the cathodes of said second pair of valves.

3. A sampling arrangement for obtaining defined pulses over one or other of two outputs in accordance with the instantaneous polarity of a control wave, comprising in combination, a first thermionic valve, means for applying a control wave to the control grid of said valve, a pair of further thermionic valves, a first resistor, a second resistor, cross-connections between the control grids and anodes of said pair of valves by way of said first and second resistors respectively, a third resistor and a fourth resistor connected respectively to the anodes of said pair of valves, means for applying a driving waveform of predetermined shape and amplitude to said third and fourth resistors, a fifth resistor connected to the cathode of said pair of valves, a first rectifier connected between the cathode of said first valve and the control grid of one of said pair of valves, a second rectifier, means for applying control potential by way of said second rectifier to the control grid of the other of said pair of valves, a capacitor connected between the point of application of said driving waveform and the end of said fifth resistor, a third rectifier connected between the end of said fifth resistor and a point of reference potential, a pair of output terminals and means for varying the potentials of said output terminals corresponding respectively to the potentials of the anodes of said pair of valves.

4. A sampling arrangement for obtaining defined pulses over one or other of two outputs in accordance with the instantaneous polarity of a control wave, comprising in combination, a first thermionic valve, means for applying a control wave to the control grid of said valve, a pair of further thermionic valves, a first resistor, a second resistor, cross-connections between the control grids and anodes of said pair of valves by way of said first and second resistors respectively, a third resistor connected to the cathodes of both of said pair of valves, means for applying a driving waveform of predetermined shape and amplitude to said third resistor, a first rectifier connected between the cathode of said first valve and the control grid of one of said pair of valves, a second rectifier, means for applying control potential by way of said second rectifier to the control grid of the other of said pair of valves, a second pair of thermionic valves having their control grids connected respectively to the anodes of said first pair and two output terminals connected respectively to the cathodes of said second pair of valves.

References Cited in the file of this patent

UNITED STATES PATENTS

| | | |
|---|---|---|
| 2,300,999 | Williams | Nov. 3, 1942 |
| 2,599,266 | Lester | June 3, 1952 |
| 2,629,825 | Eckert et al. | Feb. 24, 1953 |
| 2,639,379 | Blancher | May 19, 1953 |